United States Patent [19]

Witehira

[11] Patent Number: 5,169,735
[45] Date of Patent: Dec. 8, 1992

[54] AUTOMOTIVE BATTERY AND ELECTRICAL SYSTEM

[76] Inventor: Pita Witehira, 34 Cowley Drive, Templeview, Hamilton, New Zealand

[21] Appl. No.: 487,730

[22] Filed: Mar. 2, 1990

Related U.S. Application Data

[63] Continuation-in-part of Ser. No. 441,460, Nov. 27, 1989, abandoned, which is a continuation of Ser. No. 248,715, Sep. 26, 1988, Pat. No. 4,883,728.

[51] Int. Cl.[5] .................. H01M 2/28; H01M 10/12
[52] U.S. Cl. .................. 429/160; 429/178; 429/225; 180/270
[58] Field of Search .................. 429/160, 152, 149, 9, 429/225, 178; 180/270

[56] References Cited

U.S. PATENT DOCUMENTS

| | | | |
|---|---|---|---|
| 406,822 | 7/1889 | Dey | 429/149 |
| 1,522,613 | 1/1925 | Cole | 429/225 |
| 1,924,959 | 8/1933 | Patterson, Jr. | 320/7 |
| 3,029,301 | 4/1962 | Strider | 307/112 |
| 3,242,009 | 3/1966 | Schilke | 429/9 |
| 3,314,822 | 4/1967 | Jost | 204/2.1 |
| 3,434,883 | 3/1969 | Babusci et al. | 429/94 |
| 3,475,221 | 10/1969 | Jordan et al. | 429/9 |
| 3,556,853 | 1/1971 | Cannone | 429/241 |
| 3,758,345 | 9/1973 | Toth | 429/9 |
| 3,883,368 | 5/1975 | Kordesch et al. | 429/9 |
| 3,973,991 | 8/1976 | Cestaro et al. | 429/225 |
| 4,173,066 | 11/1979 | Kinsman | 29/623.1 |
| 4,204,036 | 5/1980 | Cohen et al. | 429/162 X |
| 4,239,839 | 12/1980 | McDowall et al. | 429/154 |
| 4,283,844 | 8/1981 | Milden et al. | 429/241 X |
| 4,473,623 | 9/1984 | Ishikura et al. | 429/225 X |
| 4,684,580 | 8/1987 | Cramer | 429/9 |
| 4,769,299 | 9/1988 | Nelson | 429/57 |
| 4,770,954 | 9/1988 | Noordenbos | 429/9 |
| 4,883,728 | 11/1989 | Witehira | 429/160 |

FOREIGN PATENT DOCUMENTS 1515688  6/1978  United Kingdom .

Primary Examiner—Anthony Skapars
Attorney, Agent, or Firm—Knobbe, Martens, Olson & Bear

[57] ABSTRACT

The present invention relates to batteries and battery systems. In particular, a battery is described which comprises a container which houses a plurality of cells. Each of the cells share a common negative terminal. Two or more positive terminal cells are provided. The specification also describes the use of such batteries to power the cranking and auxiliary circuits according to a cell discharge management scheme. Methods of forming such batteries are disclosed in which alternate positive and negative electrode plates are provided and methods of forming layered electrode plates are disclosed in which layered grids are provided and by varying the number of layers, thick and thin plates can be provided with different discharge characteristics.

29 Claims, 12 Drawing Sheets

AUTOMOTIVE BATTERY AND ELECTRICAL SYSTEM

CROSS REFERENCE TO RELATED APPLICATIONS

This application is a continuation-in-part of U.S. application Ser. No. 441,460, filed Nov. 27, 1989, which is a continuation of U.S. application Ser. No. 248,715, filed Sep. 26, 1988, now U.S. Pat. No. 4,883,728.

BACKGROUND OF THE INVENTION

The present invention relates to Electric Storage Batteries. It has particular but not sole application to Automotive Starting, Lighting and Ignition Batteries, hereinafter referred to as SLI Batteries.

The conventional automotive SLI Battery consists generally of six 2.2 volt Lead Acid cells connected in series. It is a primary function of the automotive battery to provide sufficient high electric current at short intervals to crank the internal combustion engine in order that it may start. The battery must also provide current to the coil in order to provide engine ignition.

Another important function which must also be provided is that of reserve current to provide lighting and ignition for the vehicle if the vehicle's generator is not operating.

The current requirements of the starter motor are vastly different form those of the vehicle's auxiliaries, such a lighting and ignition. On the one hand, cranking requires large amounts of current for a relatively short duration as the starter motor cranks the internal combustion engine against the compression of the cylinders. Ignition and other vehicle auxiliaries, however, require lower current rates but for long periods of time.

The conventional SLI battery system is therefore designed first to provide sufficient cranking power, and secondly to provide current to the vehicle's auxiliaries whilst the generator is not working. One other function is to act as a voltage load leveler as part of the vehicle's electrical circuits whilst the generator is operating.

It can be said that the conventional SLI battery is primarily a starting battery. However, as the automobile becomes more electrically sophisticated, the need to cater to increased auxiliary power demands places extra demands on the SLI battery, resulting in the possibility of frequent accidental discharge through the auxiliary circuits.

Engine starting requires larger electrode plate surface areas to provide sufficient cranking capacity. SLI batteries contain cell structures having multiples of thin plates as opposed to thicker plates in order to provide sufficient high current discharge for cranking.

Space restrictions within a vehicle prohibit larger or thicker plates. Thinner electrode plates, whilst suitable for rapid discharge and recharge, are not compatible with longer, slower and deeper discharge cycles which result from auxiliary power use.

When thin plates are subjected to deep discharge as could happen by accidental discharge through auxiliary circuits they tend to buckle, or lose some active material. Positive plates used in conventional SLI constructions also utilize a paste mixture of active material which increases the ability of the plate to dump current (rapid discharge) but also limits the plate's abilities to recover from the effects of deep discharge.

Attempts to overcome these problems have been made by a number of people. Thus, U.S. Pat. No. 406,822 in the name of Dey shows a battery which is divided into two cell groups by an internal dividing plate. U.S. Pat. No. 1,924,959 in the name of Patterson shows four cells, two of which are in series and two of which can be configured either in parallel or series by the throwing of a switch. The cells are totally separate. U.S. Pat. No. 3,029,301 in the name of Strider shows a construction in which two battery parts are provided in series so that six and twelve volt voltage sources can be provided. U.S. Pat. No. 3,242,009 in the name of Schilke shows the construction in which two battery parts are provided, but these are used to provide a number of different voltages. U.S. Pat. No. 3,475,221 in the name of Jordan shows two separate batteries in one container.

U.S. Pat. No. 3,758,345 in the name of Toth shows a construction in which a small auxiliary battery is provided in a shaped recess formed in the main plate. U.S. Pat. No. 3,883,368 in the name of Kordesch shows a construction in which two or more current rates are provided by the use of different types of electrodes, and U.S. Pat. No. 4,684,580 in the name of Cramer shows a construction wherein the casing for the battery has a pocket or recess into which a second or auxiliary battery can be provided. None of these patents show a construction wherein the problems of the large but short duration current required for cranking and the lower but longer duration demand required by the auxiliaries is able to be coped with in a single battery construction. U.S. Pat. No. 3,883,368 does indicate a battery which is able to cope with differing current rates, but this is only achieved by the use of different electrodes, and is not suitable for SLI applications. U.S. Pat. No. 4,684,580 in the name of Cramer could provide a construction in which different current draw offs are provided, but this is achieved only by the use of two quite separate and distinct batteries, one of which is able to be mounted on the other. Such double battery constructions require extensive changes to be made to the vehicle electrical architecture and are expensive to manufacture.

Some battery systems have been designed to overcome inconvenience to the vehicle user caused by accidental battery discharge. These include the placement of dual or multiple batteries in vehicles, thereby increasing available capacity. Double battery systems have also been developed. These double battery systems are based on the two-batteries-in-one concept whereby a main battery and a reserve battery are contained within a single structure, and a heavy switch and blocking diode system are incorporated between the main and the backup reserve battery. The blocking diode is used to prevent discharge of the backup reserve battery, while simultaneously providing charge current to the said backup reserve battery. These batteries also require a switch between the two batteries, which switch must be capable of carrying the load required to crank the vehicle. Accordingly, the switch is heavy and requires manual operation to place the two batteries into electrical parallel. Such switch backup battery constructions are expensive to produce because of the heavy current diode and switching required. In recent times, batteries have been increasing in size to overcome the problem of accidental discharge. High cold cranking amp batteries using a large number of thin multiple electrode plates are being installed into vehicles to counter the effects of increasing auxiliary electrical power load requirements.

As electrode plates become thinner, the number of plates per cell can be increased. However, this does not adequately solve the problem and does in fact result in plates being too thin to withstand the pressures of deep discharge that become more and more common as the demands on auxiliary power in the car increase.

It is therefore an object of the present invention to provide a battery which will at least obviate or minimize the foregoing disadvantages.

Accordingly, the present invention overcomes the problem of the differing current demands placed on the same battery by the modern automobile. The present invention also includes an electrical power distribution scheme which allows for discharge and recharge management of cells within the battery structure without requiring heavy duty switches or major electrical alterations to the electrical architecture. While it is possible to overcome the problem of variation in current requirements within an automobile by installation of two or more batteries, the cost to the consumer is a disadvantage, and space constraints in many automobiles make this impractical.

Accordingly, it is an objective of the present invention to provide a cost effective alternative for the consumer.

SUMMARY OF THE INVENTION

Accordingly, one aspect of the invention provides a battery including a container, one or more cells in the container, each said cell having therein at least one positive plate and at least one negative plate, at least some said plates comprising multiple layers of electrode material.

In accordance with a further aspect of the present invention, there is provided a battery comprising a single housing having a plurality of electrochemical cells therein, the plurality of cells including a first set of cells electrically connected in series to a first positive terminal cell and associated first positive terminal, a second set of cells electrically connected in series to a second positive terminal cell and associated second positive terminal, and a common negative terminal cell and associated terminal to which both the first and second sets of cells are connected in parallel, each such cell having a plurality of positive and negative electrode plates therein and an electrolyte in contact with the plates. In one preferred embodiment, the first set of cells has different discharge characteristics than the second set of cells. This can be accomplished, e.g., where the plates in the first set of cells are thicker than the plates in the second set of cells.

Preferably, at least some of the plates comprise active material of a density compatible with deep cycle abilities, that is to say, the active material is of a higher density than that used for plates designed for rapid discharge. In another embodiment, at least some of the plates comprise two or more layers of active material that are not separated from adjacent layers by plates of opposite polarity. The layers of active material in the battery may have different densities and different gas evolution characteristics during discharge and recharge.

As vehicle electric power needs increase and generators also increase in output, the battery must also be capable of receiving higher recharge current from the generator system. The present invention provides, in one particular configuration, an allowance for an increase in recharge current by providing layered electrode structures. Such structures which are not only suitable for deep discharge recycling performance, but also provide for increased strength against buckling and stress developed during high current recharge in comparison to conventional single grid frame electrodes. Indeed, tests carried out show that the layered structure of electrode plate is significantly more durable in both deep discharge and high current recharge applications than a conventional single electrode grid plate structure.

In a further aspect, the battery comprises a container having a plurality of cells, the plurality of cells including at least two positive terminal cells and at least one negative terminal cell, each cell containing a plurality of alternating positive and negative electrode plates separated from each other and constituting a cell element stack, each of the plates including active material, the positive electrode plates of the cell element stack in each positive terminal cell being electrically connected to a positive terminal, the negative electrode plates of the cell element stack in each negative terminal cell being electrically connected to a single negative terminal, each electrode plate of each cell element other than the terminal cell being electrically connected in series to the electrode plate of opposite polarity in an adjoining cell, the cells of each series of connections being electrically connected to one common negative terminal but having separate respective positive terminals; and an electrolyte in contact with the positive and negative electrode plates in each cell.

In yet a further aspect, the battery comprises a container having a plurality of cells, the plurality of cells including at least two positive terminal cells and at least one negative terminal cell, each cell containing a plurality of alternating positive and negative electrode plates separated from each other and constituting a cell element stack, each of the plates including active material. The positive electrode plates of the cell element stack and each positive terminal cell are electrically connected to a positive terminal, and the negative electrode plates of the cell element stack in each negative terminal cell are electrically connected to a negative terminal. Each electrode plate of each cell element other than a terminal cell is electrically connected to one common negative terminal but has separate positive terminals, and there is at least one other series of cells in the battery having thinner electrical connections between each cell of opposite polarity.

In yet a further aspect of the invention, the battery includes at least one series of cells having an electrode plate structure different from that of another series of cells; specifically, one series of cells utilizes separators between electrode plates within a cell element stack which have a lower resistance to electrolyte migration than the separators in another series of cells.

The invention may also provide a battery of the type discussed above, wherein the battery has lead-based electrode plate structures and wherein in one series of cells the plates are stiffened with a lead/calcium combination, and in another series of cells, a lead antimony combination is used for stiffening purposes.

The present invention also provides an automobile electrical system comprising a battery of the type discussed above in an automobile having a cranking circuit and an auxiliary circuit, wherein the negative terminal of the battery is electrically connected to the chassis of the automobile as ground, the first positive terminal is electrically connected to the cranking circuit, and the second positive terminal is electrically connected to the auxiliary circuit, so that for at least one mode of operation of the auxiliary circuit, the second positive terminal is connected only to the auxiliary circuit and not to the cranking circuit. Also, there is preferably a switch for electrically connecting the first positive terminal to the auxiliary circuit. In one preferred embodiment, the switch is operable in response to depression of the accelerator of the automobile, or other indication that the vehicle is or will soon be started, such as noise, opening of the vehicle door, or pressure on the driver's seat. Optionally, a current overload circuit breaking switch between the positive terminals is also provided.

In one embodiment, the circuit includes a starter relay for energizing the cranking circuit, and the circuit is adapted to supply the relay with current from both the first and second positive terminals. In a preferred embodiment, the electrical system includes an ignition switch, and the ignition switch includes a switch position that is adapted to provide a connection between the first and second positive terminals.

In a still further aspect, the invention provides an automobile electrical system comprising a battery with first a heavy current conductor cable connected to the battery negative terminal and earthed to said automobile, second a current conductor cable connected to one or more positive terminals of said battery and connected to a current first switch, said current switch being connected to the electric starter motor of said automobile, third a current conductor cable connected to one or more of the battery's positive terminals and to the auxiliary circuits of said automobile, fourth a current electrical conductor cable connected to one positive terminal not engaged by said second current connector cable, said fourth current conductor cable being in common circuit with the generator circuit line of said automobile, then to a second switch, fifth a current conductor cable from said second switch connected to said terminal engaged by said second current conductor cable.

The present invention also consists of a Lead-Acid Battery comprising a container having a plurality of cells including positive and negative terminal cells, each cell containing a plurality of alternating positive and negative electrode plates separated by means of a separator and constituting a cell element stack. Each of said plates is comprised of a grid having active material pasted thereon. The positive electrode plates of the cells are connected electrically. Similarly, the negative electrode plates of the cells are connected electrically. The electrode plates of each cell are electrically connected in series parallel. That is, a number of cells are connected in series, parallel to another like number of cells also connected in series but sharing the same negative electrical connection at the negative terminal.

Half of the cells preferably contain thicker positive electrode plates made up by layers of thinner plates, whilst the other half have thinner positive electrode plates. All negative electrode plates may be of the same thinner size.

This invention therefore provides for a battery having two sets of cells arranged in series parallel, thus providing dual or multi current variations at the positive terminals. That series of cells having the thinner positive plates provide high current from the connected positive terminal for short durations. The other series of cells, having thicker layered positive plates, have less plates per volume space, however the current capacity is equal to the cells having thinner plates, during longer slower discharges of the battery. The mass of the active material in the thicker plates is preferably greater than that of the corresponding material in the thinner plates.

The present invention therefore provides the vehicle manufacturers and owner with a dual or multi current battery that for cranking purposes will provide high current flows through the cells having thin positive plates with this high current available for shorter durations. A lower but longer current flow is also available from the cells having thicker layered positive plates. Whilst both sets of cells can be connected electrically for cranking purposes, only the cells have the thicker layered plates are connected electrically to the automobile's auxiliary circuits, thus providing for slower and longer discharge periods.

During recharging of the cells, all cells are connected electrically and thus the reverse cycle is occurring as in a conventional Lead Acid Battery. This is made possible because all cells share a common negative terminal to earth.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

In the following more detailed description of the invention, reference will be made to the accompanying drawings in which.

DETAILED DESCRIPTION OF THE PREFERRED EMBODIMENT

Figure 1:
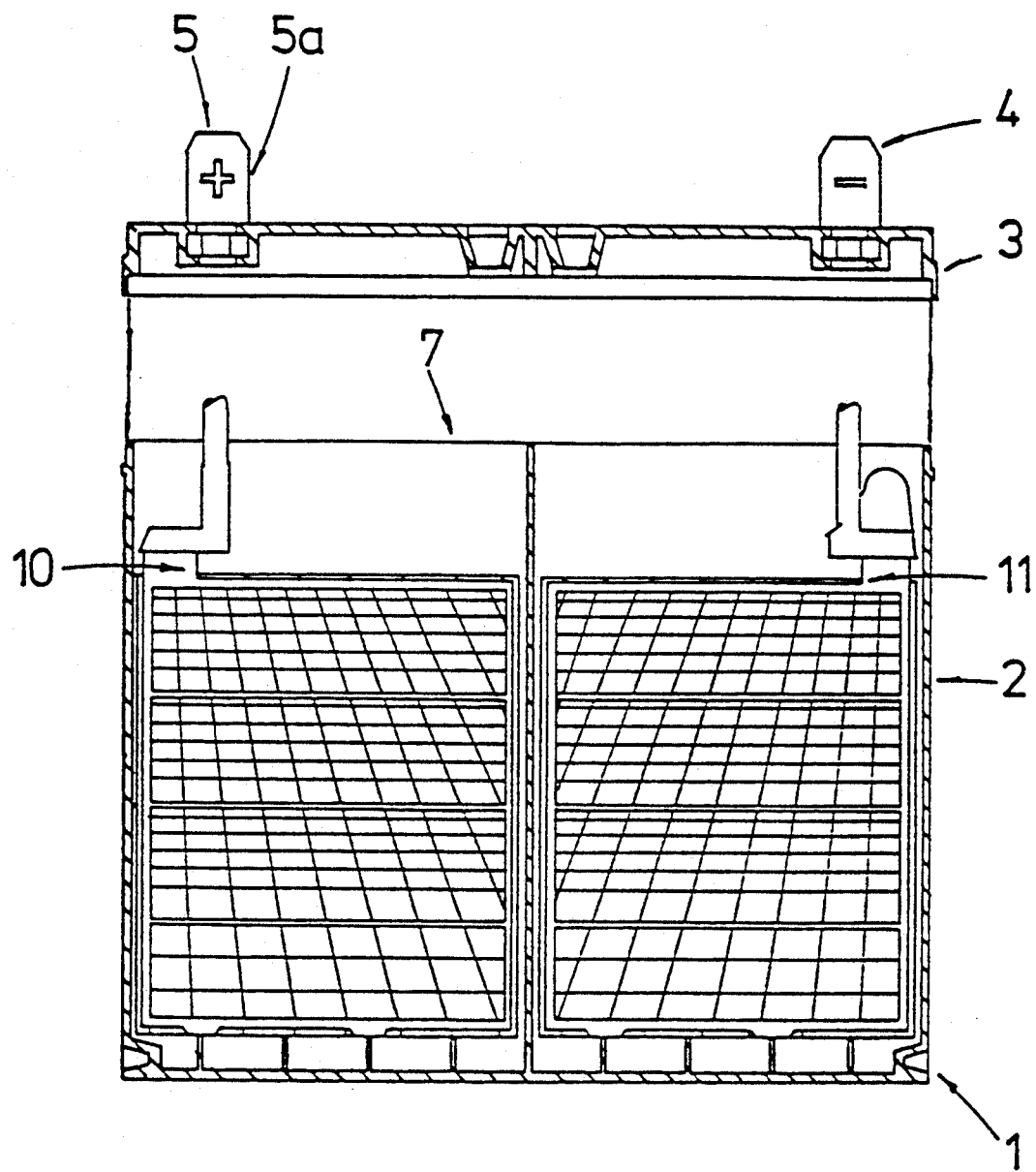
FIG. 1 is a side elevation of the battery sectioned through two cell compartments.

While the invention will be described in connection with preferred embodiments, it will be understood that the invention is not intended to be limited to the preferred embodiments. On the contrary, all alternatives, modifications and equivalents as may be included within the spirit and scope of the present invention are intended to be covered in the appended claims. Thus, while the present invention will be described in conjunction with an SLI Automobile Battery, it should be appreciated that the invention is equally applicable to any other Lead-Acid Battery application. Indeed, the present invention can be adapted to use with an absorbed electrolyte type of battery as opposed to the flooded-electrolyte battery illustrated herein.

Use of the present invention will be particularly advantageous in applications which require both the ability to provide high cranking power and the ability to provide a longer and slower power draw off from a battery encased within one casing and having dimensions equivalent to conventional SLI batteries.

In general, the present invention is predicated on the discovery that, by a unique combination of physical parameters, as will be discussed hereinafter, a Lead-Acid battery can be provided which is characterized by dual or multiple or single current flow with the ability to maintain a minimum required cranking capacity during use and/or after prolonged use of auxiliary circuits which require lower and slower current flow characteristics.

This performance characteristic can be provided for within the physical parameters of a conventional battery as set forth herein. The conventional SLI battery, as previously mentioned, requires a reserve capacity to comply with International standards. The reserve capacity of the conventional battery is calculated on the basis that, should a battery's capacity drop to 75% of normal, it must still be capable of cranking the internal combustion engine.

The present invention therefore sets out to overcome the problem of longer, slower discharges using up the available high discharge capacity required. The present invention hereinafter describes how, by weight and volume, it is possible, by "optimized configuration" to achieve a dual or multi current system within standardized battery container sizes. In this instance, advantages of the present invention are in cost savings and compatibility with conventional batteries.

The present invention can also be characterized in relation to Total Cranking Capacity when, by electrical switching, it is possible to obtain full use of all active material within the battery for usual day to day use as a conventional SLI battery. By electrical circuit design, it is also possible to isolate that section of the battery characterized by plate design described herein as best suited for slower and longer current drawoff than cranking requires. By switch or circuit design, the present invention also prevents use of the cranking capacity by the auxiliary circuits within an automobile.

The present invention will show that battery durability is increased substantially by distinguishing specific current requirements within the optimized configuration.

DETAILED DESCRIPTION OF THE INVENTION

Turning now to a more detailed description of the present invention, there is shown in FIGS. 1 to 5 a preferred embodiment of a 12-volt 12-cell battery of the present invention.

FIG. 1 shows a battery 1 with a premoulded container 2 with cover 3 lifted which will be attached to the container by suitable means. 4 is a negative terminal post, while both 5 and 5a (obscured) are positive terminal posts. While the terminal posts are illustrated as top terminals, side terminals or other terminal configurations could likewise be employed.

Each cell, as illustrated by FIG. 1, has a plurality of independent, alternately disposed, positive electrode plates 10) and negative electrode plates 11). The plates 10 and 11 are disposed generally perpendicularly and parallel to the partitions 7 but may also be at right angles.

Figure 2:
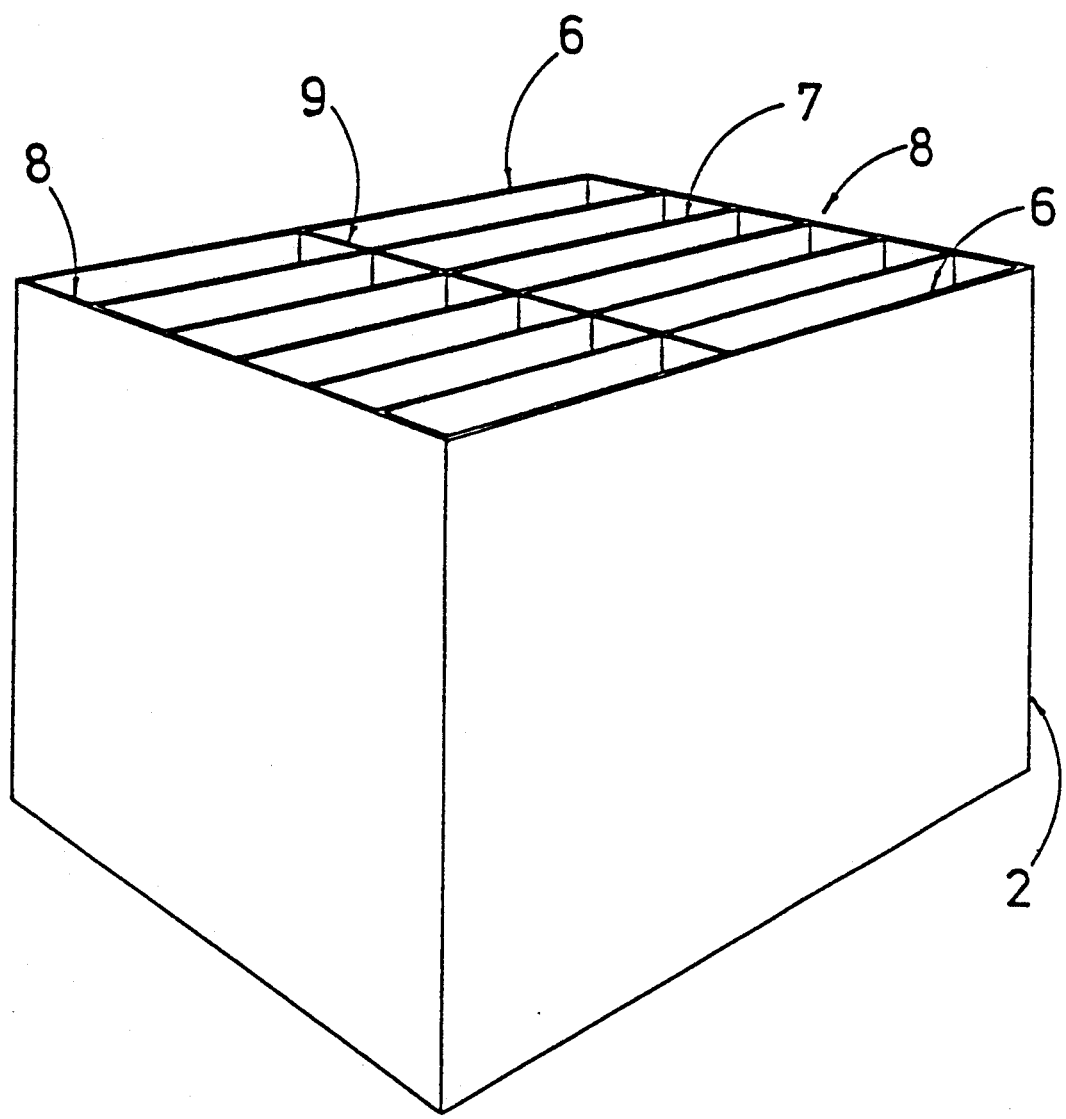
FIG. 2 is a perspective view of the monobloc injection moulded battery case showing internal partitions.

The container, as best seen in FIG. 2, is divided into a plurality of cell compartments by integrally formed partition walls 7 which lie essentially parallel to the end walls 6 of container 2 and at right angles to a further partition 9 which runs parallel to walls 8, thus providing 12 cell compartments within the container. Whilst illustrated as 12 cells running in parallel to walls 8, other configuration could likewise be employed. Wall 9, for example, is not required when "absorbed" electrolyte is employed. Wall 9 is essential when flooded electrolyte is employed.

Figure 3:
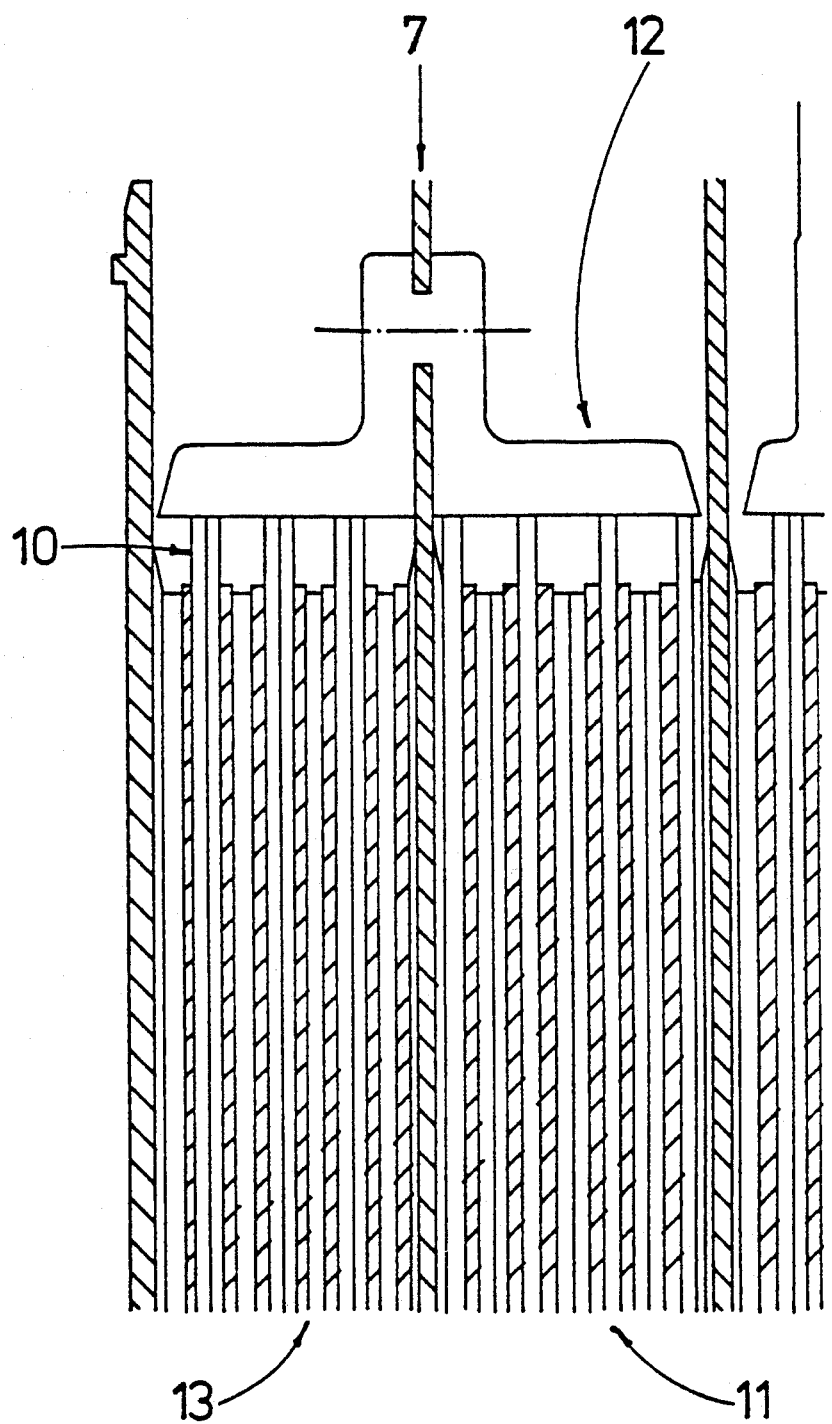
FIG. 3 is a vertical cross section through a cell and cutting through cell plates, showing cells having thicker layered but fewer positive plates, showing intercell connections.

FIG. 3 sets forth an example of alternative layered positive electrode plates 10 from end on and conventional negative electrode plates 11. A series connection through wall 7 is also illustrated by use of conventional lead straps 12. Separators 13 are also illustrated as in conventional flooded electrolyte cells. However, absorbed electrolyte may also be used as separators in a further aspect. In one particularly preferred embodiment, the separators 13 in one series of cells have a greater permeability to electrolyte migration than the separators in another series of cells.

Figure 3A:
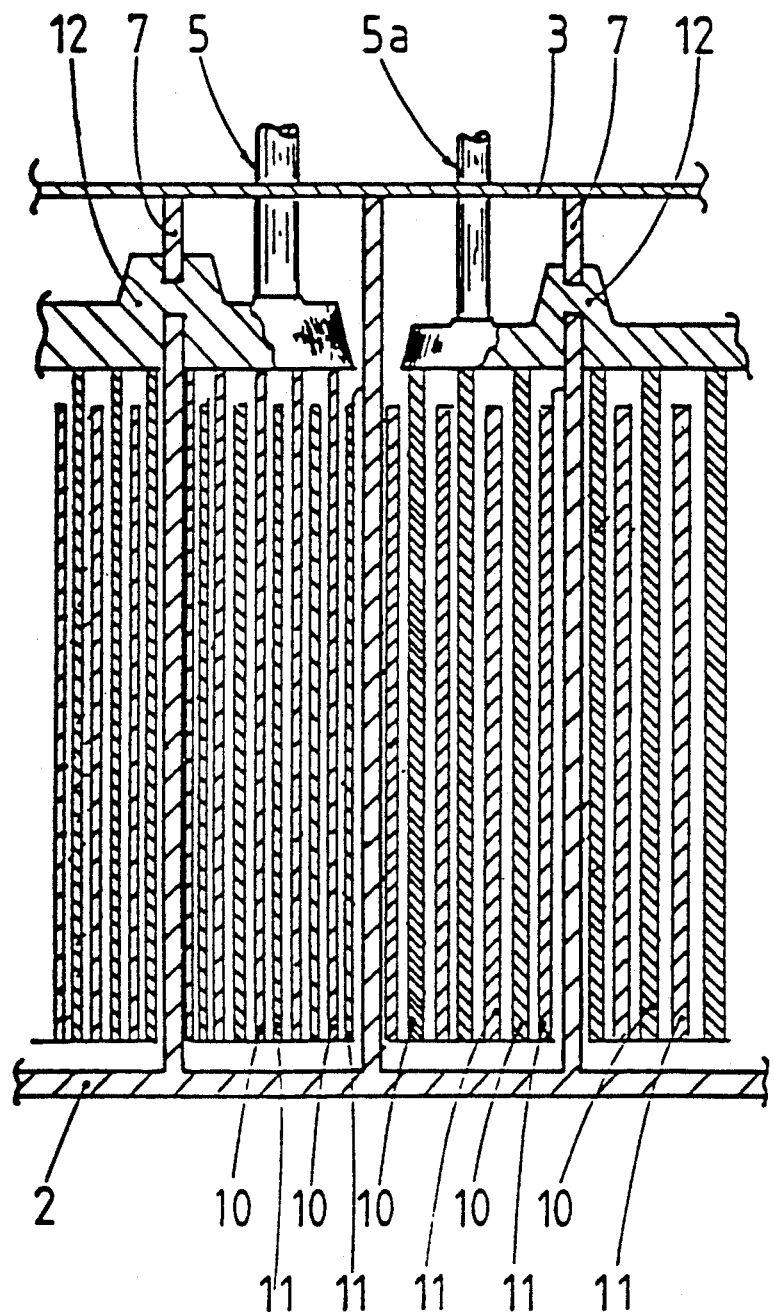
FIG. 3A is a vertical cross section through two cells, taken in the manner of FIG. 3.
Figure 3B:
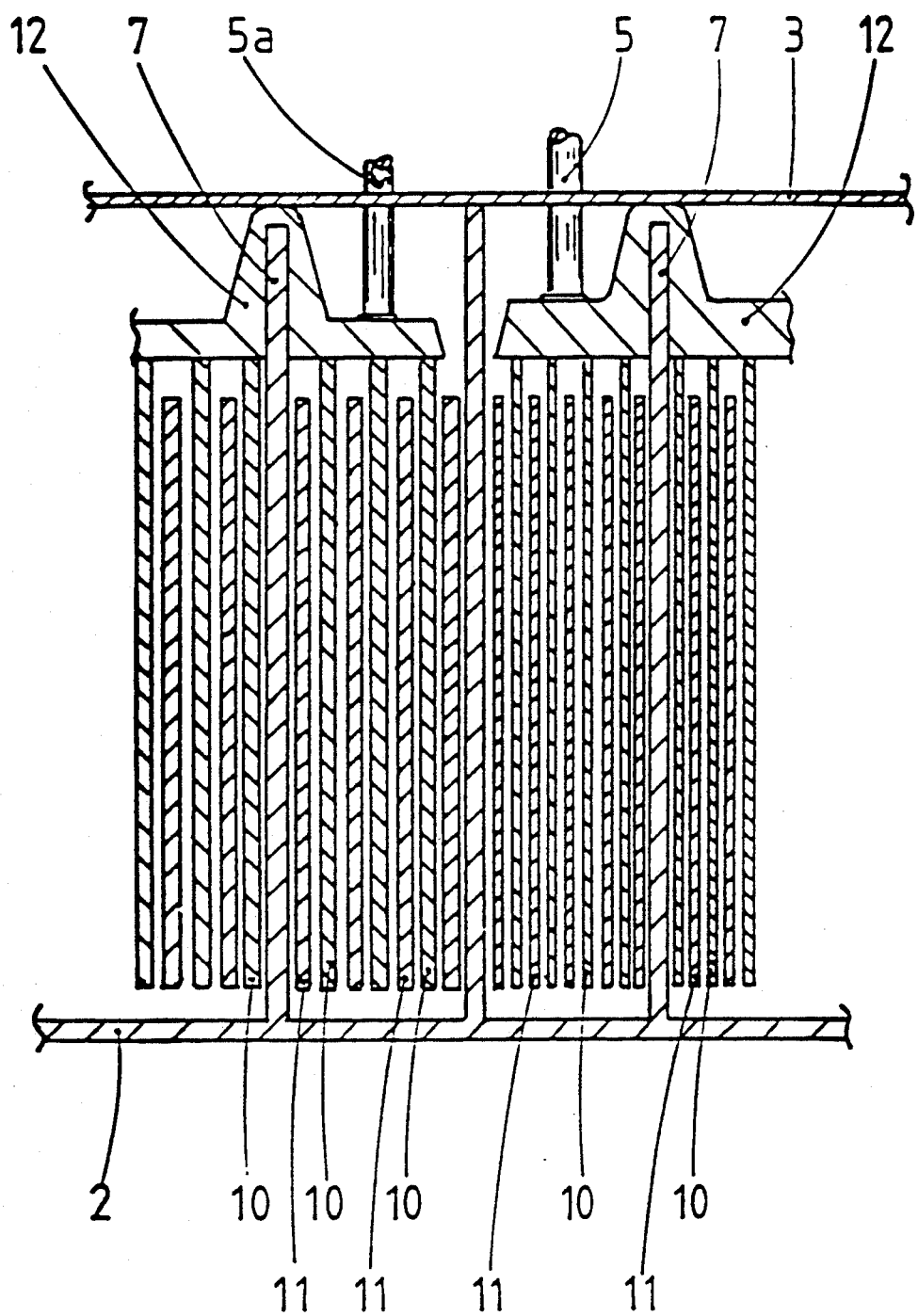
FIG. 3B is another vertical cross section through two cells, taken in the manner of FIG. 3.

FIG. 3A illustrates a vertical section through the plates of portions of four cells, showing intercell connections. One cell bus 12 is connected to positive electrode plates 10, and is connected through the partition 7 to the next cell in the series by means of an intercell connection, which can advantageously be made of lead or other conductive material. Similarly, a cell in the second series is connected to positive electrode plates and is connected to the adjacent cell by means of a cell bus and intercell connection 12. Note that the positive and negative electrode plates 10, 12 associated with the second series of cells (having positive terminal 5A) are thicker than the corresponding plates associated with the first series of cells (having positive terminal 5). The plates 10, 12 associated with the second series of cells have deeper cycle, slower discharge characteristics than the thinner plates 10, 12 in the high current, rapid discharge first series of cells connected to positive terminal 5. Preferably, the density of the active material used in the plates 10 and/or 11 on the deep cycle side of the battery 1 is greater than that of the corresponding plates on the high current side of the battery.

On the deep cycle side of the battery, for example, the density of the active material is preferably 4.3–4.7 g/cc, most preferably about 4.1 g/cc, while on the rapid discharge side, the density is preferably about 3.9–4.3, most preferably about 4.5 g/cc.

Note also that the intercell connections and current busses 12 are thicker in the high current side of the battery, associated with the first positive terminal 5.

Figure 4:
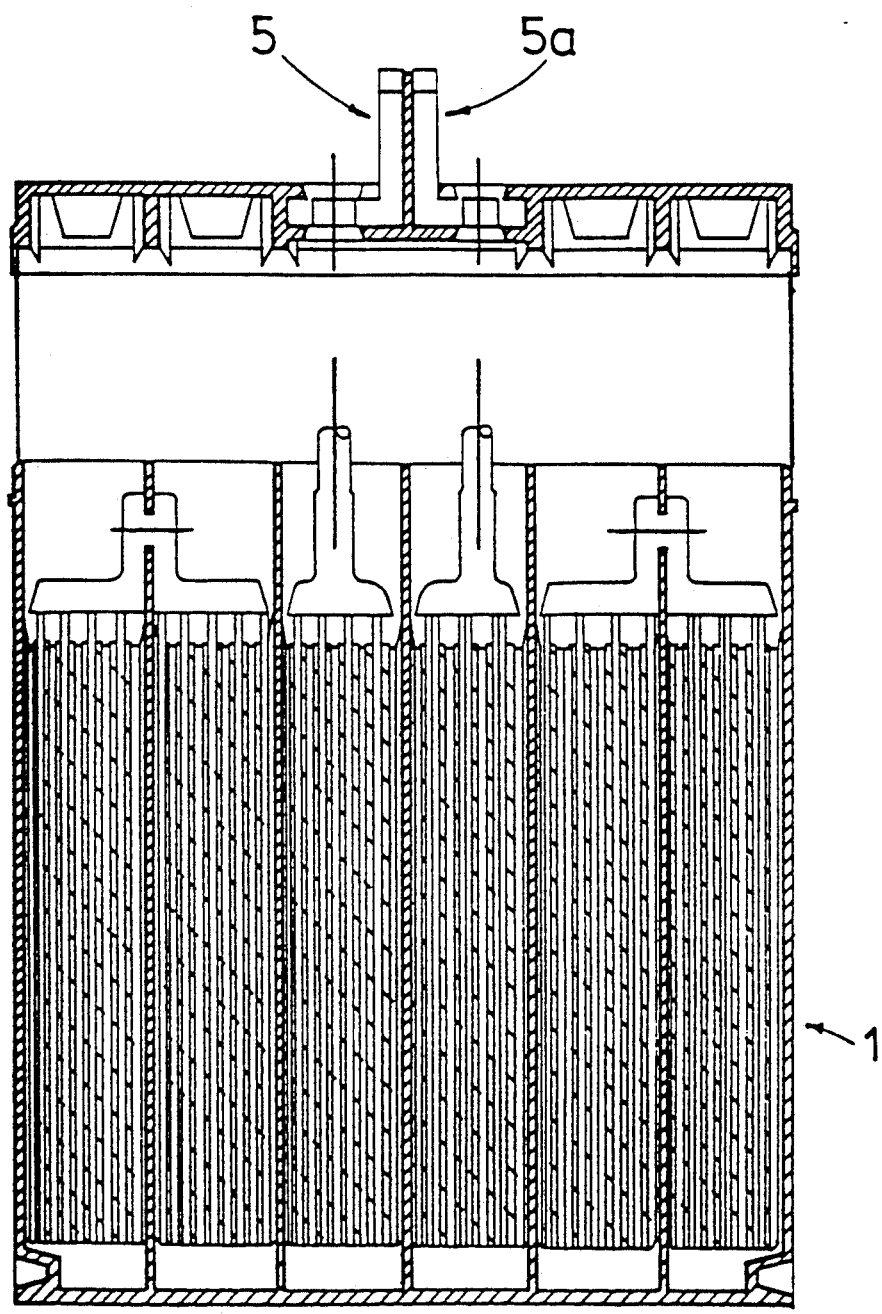
FIG. 4 is an end elevation of the battery sectioned through the positive terminals.

FIG. 4 shows a section through the positive terminals 5 and 5a of the present invention in a dual current configuration as separate from a multi-current configuration and indicates positive terminals 5 and 5a in close proximity.

Figure 5:
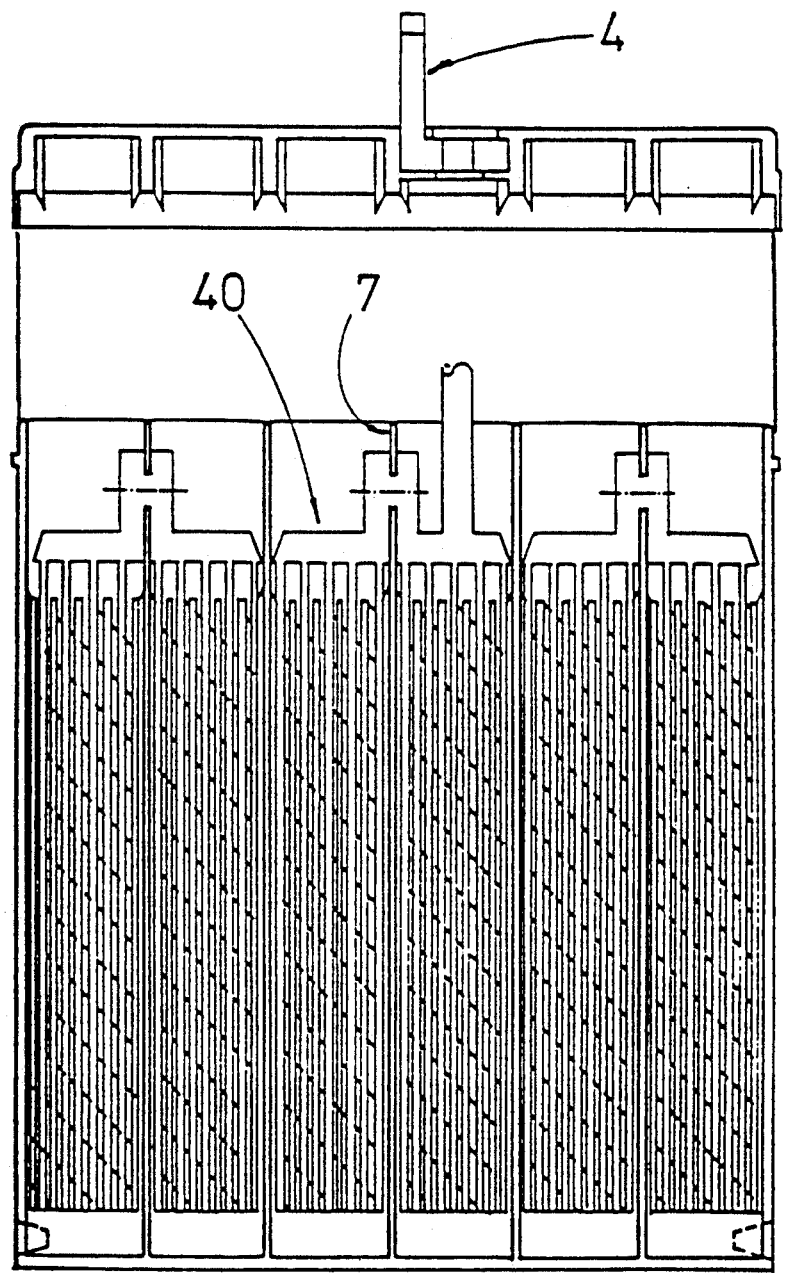
FIG. 5 is an end elevation of the battery sectioned through the negative terminal.

FIG. 5 shows a section through the negative terminal 4 of the present invention and indicates common negative terminal connections through partition 7 by strap 40.

Figure 6:
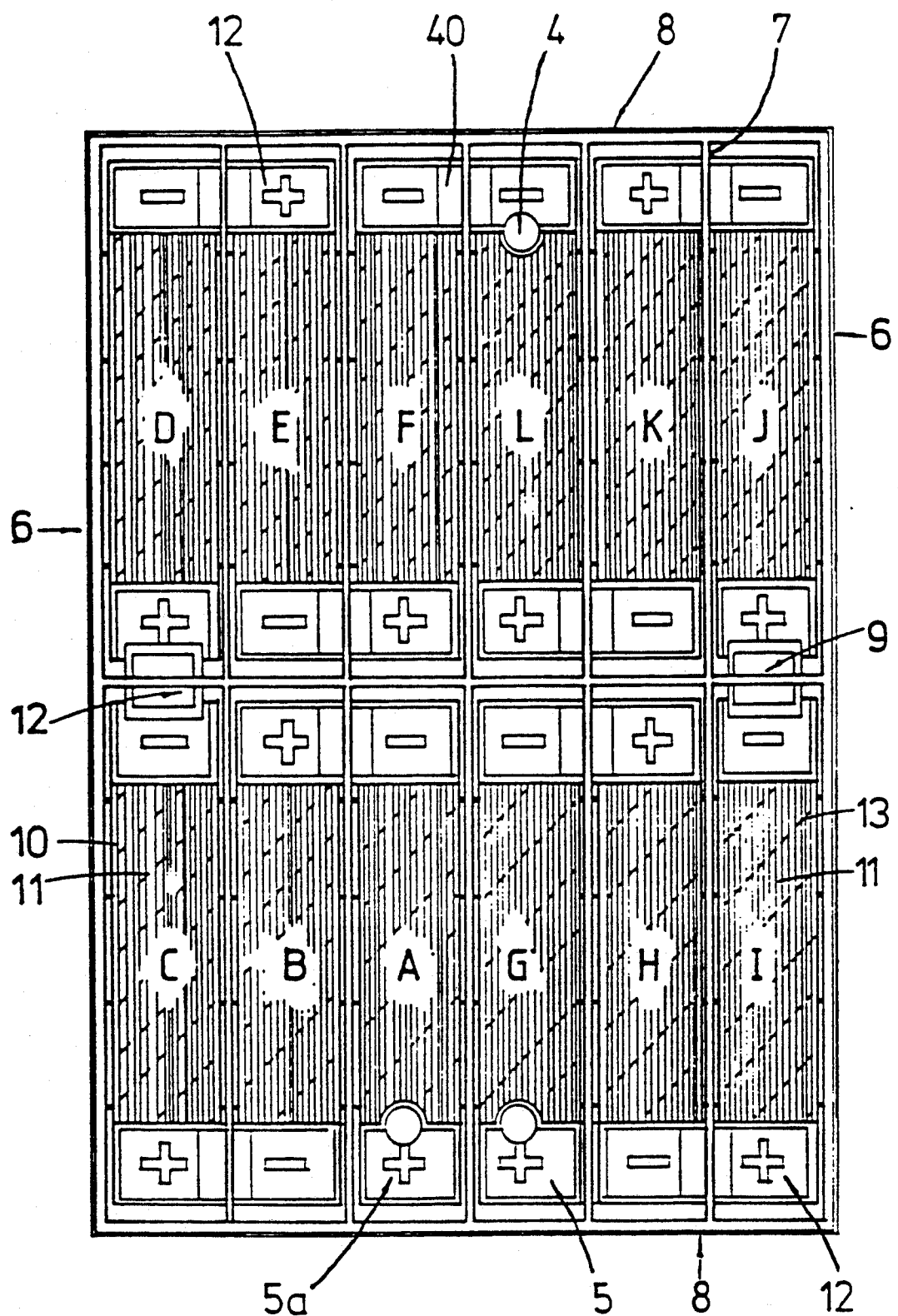
FIG. 6 is a top plan view of the battery with lid removed showing cells arranged in series parallel.

FIG. 6 is an overhead view of the cell compartments indicating partitions 7, intercell connections 12 and positive connections 5 and 5a and negative connection 4 which indicate a series parallel arrangement of cells.

In accordance with the present invention, cells A to F of FIG. 6 have three layered positive electrode plates 10 and conventional negative electrode plates 11. Cells G through L have four conventional positive electrode plates 10 and five conventional negative plates 11. Cells A to F are connected in series, and are connected in parallel to cells G to L by straps 12. Cell F is connected through the partition, over the partition, or through the lid to cell L by strap 40 at the negative terminal. The negative terminal is preferably located on the cranking side of the battery. Cells A and G show separate positive post to terminal connections 5 and 5a of FIG. 1. Partition 9, as indicated previously, is not required when absorbed electrolyte is used.

Figure 6A:
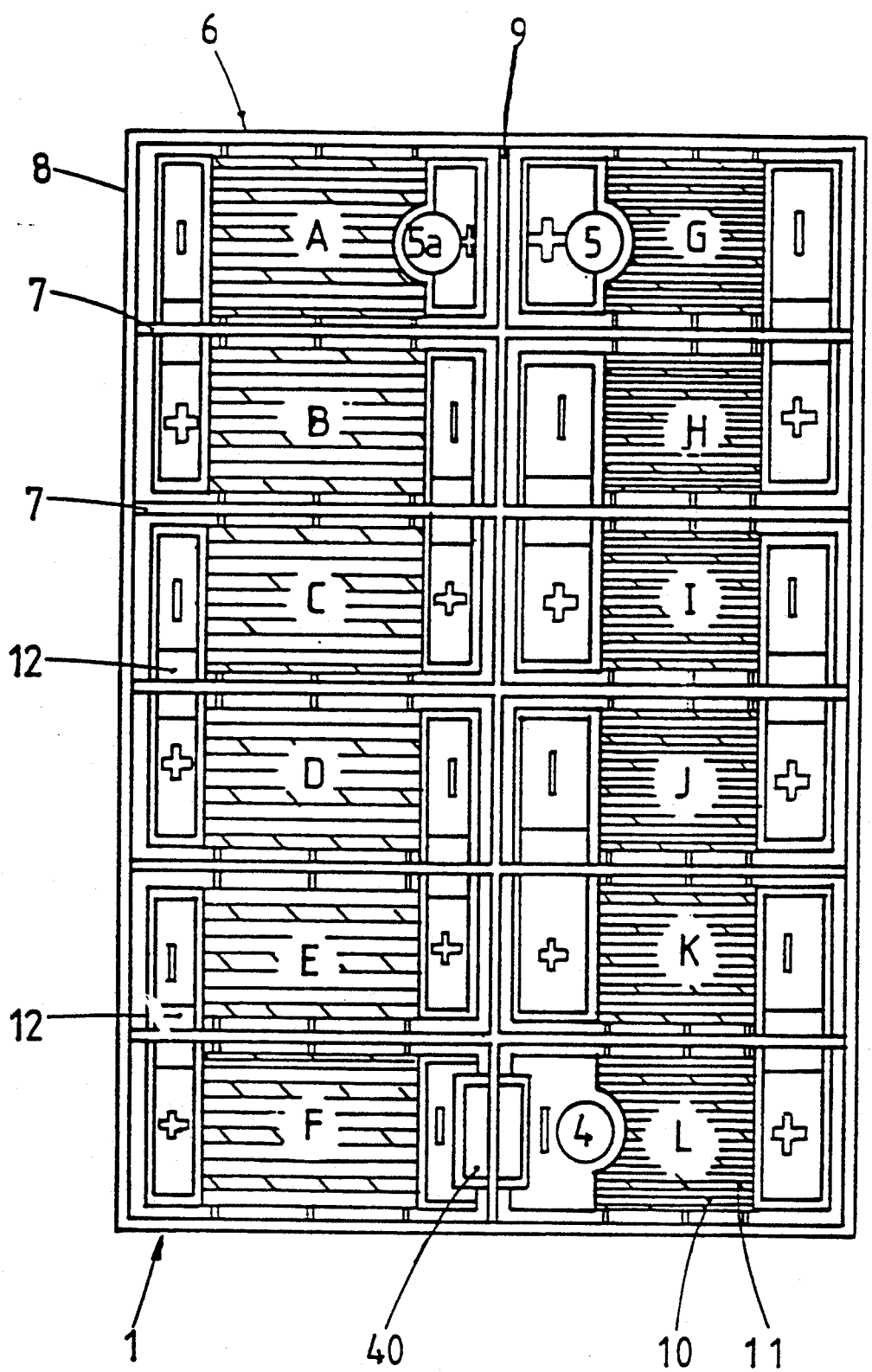
FIG. 6A is another top plan view of the battery with the lid removed showing another arrangement of cells in the battery.

FIG. 6A corresponds to FIG. 6, except that the cells are laid out so that each series of cells A-F and G-L runs in a straight line along the length of the battery 1, and the two series are arranged in parallel fashion, not only electrically, but geometrically. This alternative layout permits a more compact battery than that illustrated in FIG. 6.

Figure 7:
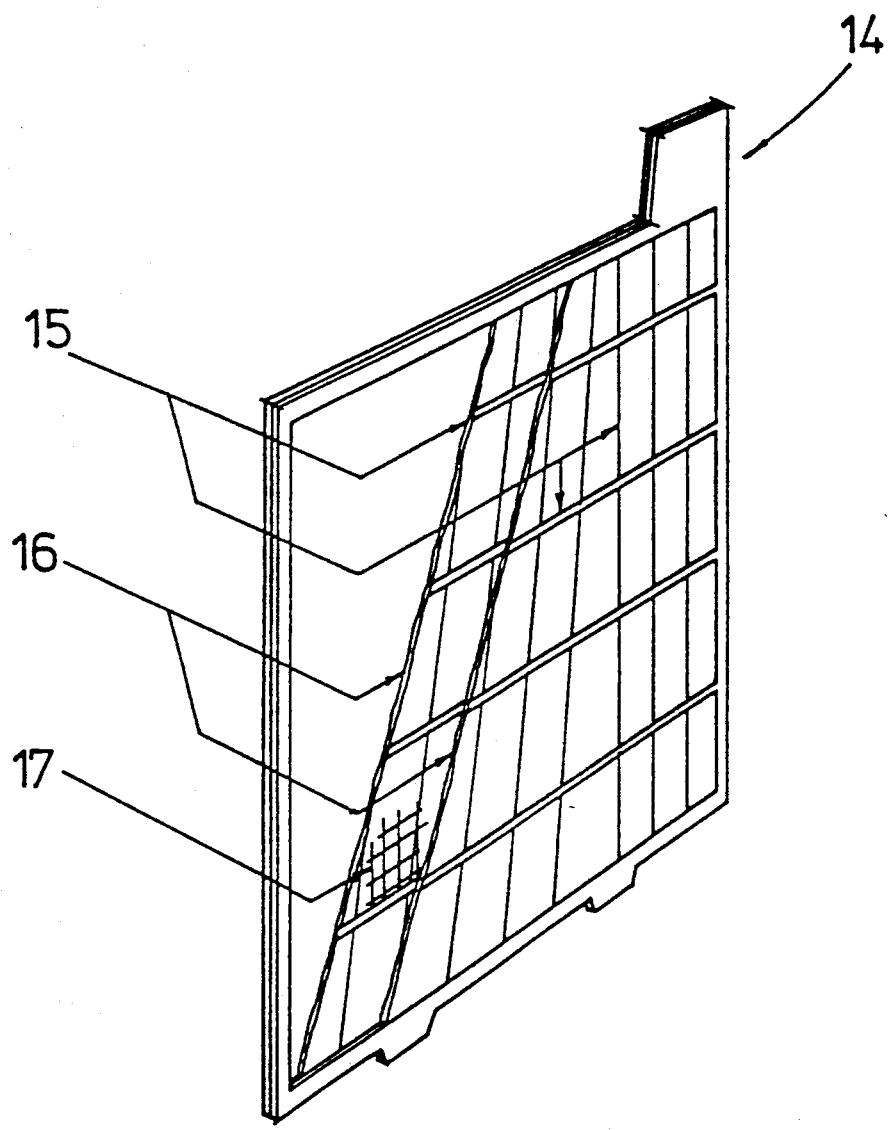
FIG. 7 is a perspective illustration of a layered electrode plate structure.

FIG. 7 is a perspective view of a layered electrode plate structure which indicates a section of active materials removed for clarity of illustration. A frame 14 has a similar appearance to conventional plate structures but consists of two or more frame structures placed against each other and having grids 15 which provide current paths which also restrain the active material 16. A glass fiber mat 17 is also illustrated which is placed between the frames 14 and grids 15 prior to "pasting" over from either side of plate frames with active materials.

It will be understood, of course, that layered plate construction is optional, and that conventional plate construction can be used throughout the present battery. Moreover, while lead and lead oxide are the most common battery plate materials for automotive use, it is well within the skill of the art to substitute conventional lead/antimony plates (for deep cycling) and calcium/-lead plates (for rapid discharge). Indeed, one embodiment of the invention includes one series of cells having calcium/lead construction, and another series having lead/antimony construction.

Capillary action, enhanced by vehicle motion, allows electrolyte accessibility to the inner depths of the active material.

Whilst it is appreciated that greater surface area of active material directly increase by proportion the high current performance of a conventional battery, the present invention provides, by use of dual or multiple layered positive electrode plates, not only high cranking current when required but also longer lasting but lower electrical current when being used for auxiliary loads. The use of layered positive plates provide greater resistance to damage as a result of deep discharges that occur when the auxiliary circuits are operated for longer periods of time. The discharge/recharge cycle of a Lead-Acid battery places pressure on the positive plates in particular. A conventional SLI battery is in effect a design trade-off between a deep cycle battery, which uses thick positive plates to counter the effects of deep discharges and recharge cycles, and a battery having a greater number of thinner plates to provide the maximum high current for cranking but for relatively short periods of time.

When an internal combustion engine is being cranked, the current requirements are so great that rapid discharge occurs. However, because the discharge is so rapid, generally only the electrons at the plate surface are used. Electrons deeper in the active material may not be available until the cranking draw off is stopped for a period. A second attempt at cranking will produce a further flow of current. Thicker plates require more space volume to provide larger surface area for cranking power. Thicker plates also require longer recharge cycles.

The present invention overcomes the problems of plate stress caused by longer or deeper discharges resulting from prolonged auxiliary use. It is also effective in providing surface current for rapid discharges.

The use of layered positive plates also places less recharge strain on the vehicle's generator/alternator which would be the case if thick plates are used. Thick plates, as previously mentioned, provide for deeper and longer discharges but also require deeper and longer recharges.

Thin layered positive plates as in the present invention not only provide for greater strength than a thick plate of equal dimensions, but also make it easier for the electrolyte to penetrate into the active material of the plates.

The cell configuration shown in FIG. 6 is only exemplary and many other configurations could be used as the particular design is not crucial. Similarly, other multiples of plates within each cell may be employed depending on overall capacity requirements of the specifications. The combination of layered plates also may include all cells depending on the specification requirements, or more of less cells than indicated in FIG. 6.

The use of thick, deep cycle plates, either in combination with layered plates or thin plates, can also be used to provide alternative current "types."

Turning now to manufacturing costs: The present invention, as previously mentioned, is generally housed within the same dimensional parameters as an equivalent conventional SLI battery. Because the conventional battery is designed primarily as a cranking battery, emphasis has been directed to heavy intercell connectors so as to reduce resistance and thus enhance performance. The present invention, however, can provide a compromise by providing dual/multi currents at positive terminals in close proximity, as indicated in FIG. 3. The intercell connectors may be comparatively reduced in weight, as by circuit design it is possible to avoid a voltage drop at the ignition coil, resulting in a larger ignition spark and thereby reducing the required cranking capacity. It should be noted that the intercell connections can be made through cell dividing partitions, over the top of such partitions, or in the lid or case of the battery.

The active material used in the present invention is equal in weight and volume to a conventional SLI battery of the same dimensions. The lead grids used in the present invention may, in the case of the layered configuration, be moulded from pure lead. The layered plates, as previously discussed, create a stronger structure, thus reducing the need for additives such as antimony or calcium. In this regard, the gassing problems created by the lead additives are reduced and the present invention, though able to "deep cycle," is also able to be manufactured as a "maintenance free" type battery.

In one embodiment of the invention, one set of cells has a lower gas production during discharge than another set of cells. In this manner, the high current side of the battery may be made as a conventional "maintenance free" battery, and the deep discharge side can be made as a conventional "low maintenance" battery, as those terms are commonly used in the art.

The Monobloc Injection Moulded casing, FIG. 2, shows one extra partition 9 as compared to a conventional battery. This partition is required in the flooded electrolyte version of the battery. The partition, although apparently requiring more plastic material, has in fact created a saving by weight of material used. Partition 9 strengthens the casing by providing lateral support. This then allows a reduction in wall and partition thicknesses. For example, a conventional 12 volt lead-acid automobile battery would have external walls measuring between 2.75 mm and 3.25 mm. Internal partitions on conventional batteries of similar size measure between 1.75 mm and 2.75 mm. The present invention, in wet form, because of lateral support provided by partition 9, reduces the required thickness of the external walls 6 and 8 of FIG. 2 to between 2.0 mm and 2.75 mm. Similarly, the internal partitions can be reduced to between 1.50 and 1.75 mm. The additional plastic or polypropylene required for partition 9 is more than compensated for by the reduction in the thickness of all walls and partitions.

Calculations of manufacturing costs also must include plant alterations, etc. The present invention is designed to overcome the need for any plant alterations. Indeed, the battery can be manufactured by any well established Lead-Acid Battery manufacturer without substantial plant alterations. The injection moulding of the casing and lid would differ from those used for conventional batteries. The injection moulding operation is normally separated from the assembly procedures, so there are no problems of integration. The present invention's injection moulding requires no new material by weight or volume, and would not increase the cost more than between 10% and 20% over the cost of manufacturing a conventional battery. When comparing it with the practice of using two batteries in an automobile, it is of course far cheaper.

Figure 8:
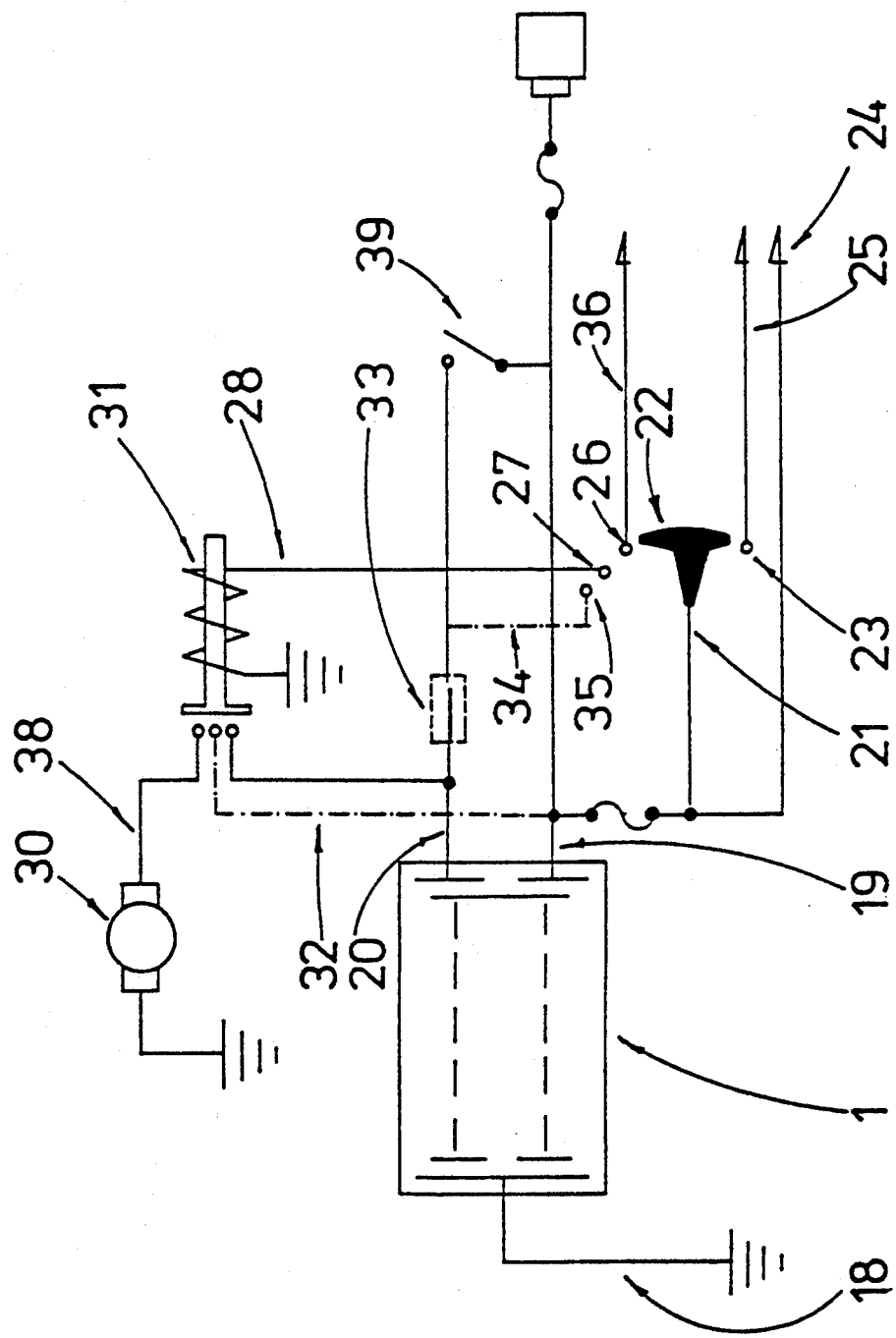
FIG. 8 is a diagrammatic view of an electrical layout usable with the battery of the invention.

FIG. 8 refers to a battery 1 of the type described herein. The battery is earthed or grounded through earth connector 18. The battery provides two positive leads 19 and 20. Positive lead 19 is applied to the common terminal 21 of ignition switch 22. The ignition switch 22 may provide a spare terminal 23 which can be contacted by, for example, a reverse turn of the key from which extends electrical conductor 25 which may be used, for example, to allow a radio to play while the key is out. That is to say it can provide an electrical connection when the key is in an unlocked position. Lead 36 extending from terminal 26 is utilized for the auxiliaries and ignition circuits of the motor vehicle in which the battery 1 is to be used. The generator is connected directly to lead 19. Terminal 27 provides current through lead 28 to the solenoid 31 which is then activated to provide current to the starter motor 30 through lead 38. Lead 32 is an option and further high current lead from the second positive terminal. If this lead is provided, it effectively connects the two parts of the battery in parallel, thereby providing additional current capacity to the starter motor 30. When lead 32 is not provided, a terminal cut-off switch 33 is desirably provided. A solenoid switch can be provided in lead 34 which extends between a further terminal 35 in the ignition switch 22 and the positive lead 20. A trip switch 39 may be provided which is able to be operated by, for example, movement of the accelerator of the vehicle, the oil pressure switch, the voltage regulator, or some other item with the desired item being the accelerator so that the switch becomes closed as the accelerator is pressed. Switch 39 must be provided to allow for recharging of the battery in use, eliminating the need for a diode in the circuit. Lead 24 is the general accessory lead which supplies current to vehicle accessories independent of the ignition switch.

Figure 9:
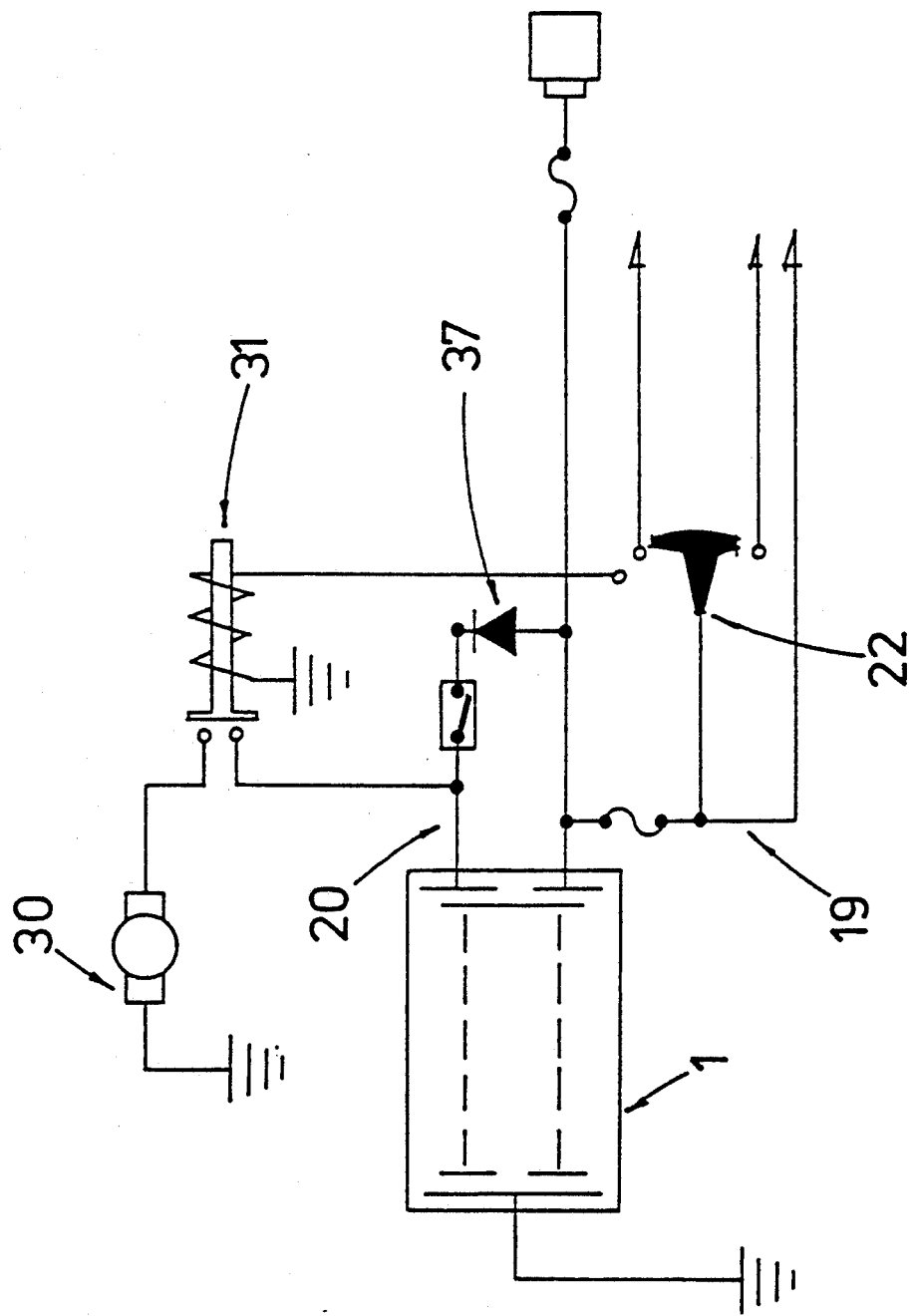
FIG. 9 is a diagrammatic view of an alternative electrical layout.

FIG. 9 shows the construction of the battery 1 being provided in substantially the same manner along with ignition switch 22 and positive leads 19 and 20. Between the positive leads 19 and 20 is connected a diode 37 which allows for recharging of the two parts of the battery during standard use in substantially the known manner and without the need to provide switch 36 or lead 32 of FIG. 8.

Thus, it can be seen that, at least in the preferred form of the invention, a battery is provided in which electrode plates are layered structures which provide electrolyte accessibility deep within the available active material pasted thereon. A battery, which by combination of thicker and thinner electrode plates, the thickness of which may be determined by more or less layers, arranged in cell structures that share a common earth terminal but have one or more positive terminals, which thereby provide, through electrical scheme plan, a discharge management capability of said cells and according to a current characteristic which is variable by choice of plate structure thickness.

What is claimed is:

1. A battery comprising a single housing having a plurality of electrochemical cells therein, said plurality of cells including a first set of cells electrically connected in series to a first positive terminal cell and associated first positive terminal, a second set of cells electrically connected in series to a second positive terminal cell and associated second positive terminal, and a common negative terminal cell and associated terminal to which both the first and second set of cells are connected in parallel, each said cell having a plurality of positive and negative electrode plates therein and an electrolyte in contact with said plates, wherein said first set of cells has different discharge characteristics than said second set of cells.

2. A battery as claimed in claim 1, wherein some of the plates in said first set of cells are thicker than the plates in said second set of cells.

3. A battery as claimed in claim 1, wherein said plates contain active material, and the density of said active material in the plates of said first set of cells is greater than that in the second series of cells.

4. A battery as claimed in claim 1, wherein at least some said plates comprise two or more layers of active material that are not separated from adjacent layers by plates of opposite polarity.

5. A battery as claimed in claim 4, wherein said lay plates comprise layers of grids holding layers of active material.

6. A battery as claimed in claim 1, wherein said cells are divided by partitions and intercell connections are made through said partitions.

7. A battery as claimed in claim 1, wherein said cells are divided by partitions and intercell connections are made over said partitions.

8. A battery as claimed in claim 1, wherein said battery has a lid and intercell connections are made in said lid.

9. A battery as claimed in claim 1, wherein one set of cells has electrode plates that produce less gas during discharge than the other set of cells.

10. A battery comprising a first series of cells and a second series of cells, said first and second series of cells sharing a common negative terminal but having separate positive terminals, wherein the construction of the cells in said first series is different from that of said second series, and wherein the cells in said first series and lead/calcium cells and the cells in said second series are lead/antimony cells.

11. A battery comprising first series of cells and a second series of cells, said first and second series of cells sharing a common negative terminal but having separate positive terminals, wherein the construction of the cells in said first series is different from that of said second series, and wherein the cells in said battery comprise multiple electrode plates of alternating polarity separated by porous separators, and wherein the separators in said first series are of greater permeability to electrolyte than those of said second series.

12. A battery comprising a first series of cells and a second series of cells, said first and second series of cells sharing a common negative terminal but having separate positive terminals, wherein the construction of the cells in said first series is different from that of said second series, and wherein said cells are connected to adjacent cells in the series by means of intercell connectors, and wherein the intercell connectors in said first series are heavier than those in said second series.

13. A battery comprising a first series of cells and a second series of cells, said first and second series of cells sharing a common negative terminal but having separate positive terminals, wherein the construction of the cells in said first series is different from that of said second series, and wherein said first series of cells has a different electrical discharge characteristic than said second series of cells.

14. The battery of claim 13, wherein said first series of cells has a higher current capability than said second series of cells.

15. The battery of claim 13, wherein said cells each include battery plates and wherein at least some of the plates in said first series are thinner than corresponding plates in said second series.

16. A vehicle electrical system comprising a battery according to any of the preceding claims in a vehicle having a cranking circuit and an auxiliary circuit, wherein the negative terminal of said battery is electrically connected to the chassis of said vehicle as ground, the first positive terminal is electrically connected to said cranking circuit, and the second positive terminal is electrically connected to said auxiliary circuit, so that for at least one mode of operation of said auxiliary circuit, said second positive terminal is connected only to said auxiliary circuit and not to said cranking circuit.

17. A vehicle electrical system as claimed in claim 15, comprising a switch for electrically connecting said first positive terminal to said auxiliary circuit.

18. A vehicle electrical system as claimed in claim 16, wherein said switch is operable in response to depression of the accelerator of the vehicle.

19. A vehicle electrical system as claimed in claim 16, wherein said switch is actuated in response to opening and closing of the driver's door.

20. A vehicle electrical system as claimed in claim 15, further comprising a current overload circuit breaking switch between said positive terminals.

21. A vehicle electrical system as claimed in claim 15, including a starter relay for energizing said cranking circuit, said system adapted to supply said relay with current from both said first and second positive terminals 22. An electrical system as claimed in claim 16, wherein said electrical system includes an ignition switch, and said ignition switch includes a switch position that is adapted to provide a connection between said first and 23. An electrical circuit as claimed in claim 20, wherein said current overload circuit breaking switch is a thermal current overload circuit breaking switch.

24. A vehicle electrical system, comprising:
a battery system having at least first and second positive terminal cells and at least one negative terminal cell, said first positive terminal cell connected through a first series of cells to said negative terminal cell and said second positive terminal cell connected through a second series of cells to said negative terminal cell, wherein said first series of cells has a higher rapid discharge current than said second series of cells, said cells containing electrode plates, wherein the plates in said second series are thicker than those in said first series;
a first electrical conductor grounding said negative terminal cell to said vehicle;
a second electrical conductor operatively connecting said first positive terminal cell to the starter motor of the vehicle; and
a third electrical conductor operatively connecting said second positive terminal cell to the auxiliary circuits of said 25. The system of claim 24, further comprising a first for connecting said second conductor to said battery, and a second switch for connecting said first positive terminal cell to said second positive terminal cell.

26. A vehicle electrical system, comprising:
a battery system having at least first and second positive terminal cells and at least one negative terminal cell, said first positive terminal cell connected through a first series of cells to said negative terminal cell and said second positive terminal cell connected through a second series of cells to said negative terminal cell;
a first electrical conductor grounding said negative terminal cell to said vehicle;
a second electrical conductor operatively connecting said first positive terminal cell to the starter motor of the vehicle;
a third electrical conductor operatively connecting said second positive terminal cell to the auxiliary circuits of said vehicle; and
a switch for selectively connecting said first positive terminal cell to said second positive terminal cell.

27. A vehicle electrical system as described in claim 26, wherein said first and series of cells contain electrode plates and have different discharge characteristics.

28. A vehicle electrical system as described in claim 27, wherein the plates in said second series are thicker than those in said first series, whereby said first series of cells has a higher rapid discharge current than said second series of cells.

29. A battery including a container, at least two cells said container, each cell having therein at least one positive plate and at least one negative plate, at least some plates in each cell having a plurality of layers, at least some plates in one said cell having a greater number of layers than the plates in at least one of the other said cells.

* * * * *